United States Patent
Liu

(10) Patent No.: US 8,380,152 B2
(45) Date of Patent: Feb. 19, 2013

(54) ASYMMETRIC GAIN COMMUNICATION DEVICE AND COMMUNICATION METHOD THEREOF

(75) Inventor: Hsin Hung Liu, Taipei County (TW)

(73) Assignee: Moxa Inc. (TW)

( * ) Notice: Subject to any disclaimer, the term of this patent is extended or adjusted under 35 U.S.C. 154(b) by 107 days.

(21) Appl. No.: 12/973,610

(22) Filed: Dec. 20, 2010

(65) Prior Publication Data

US 2012/0157012 A1    Jun. 21, 2012

(51) Int. Cl.
*H04B 1/06* (2006.01)
*H04K 3/00* (2006.01)
(52) U.S. Cl. ...................... 455/277.2; 455/73
(58) Field of Classification Search ............ 455/73, 455/130, 277.1–277.2
See application file for complete search history.

(56) References Cited

U.S. PATENT DOCUMENTS

| 6,594,475 | B1 * | 7/2003 | Anvekar et al. ............ 455/277.1 |
| 2003/0146876 | A1 * | 8/2003 | Greer et al. .................... 343/702 |
| 2004/0014430 | A1 * | 1/2004 | Melamed ........................ 455/73 |

* cited by examiner

*Primary Examiner* — Lee Nguyen
(74) *Attorney, Agent, or Firm* — David R. Stevens; Stevens Law Group

(57) ABSTRACT

An asymmetric gain communication device and the communication method thereof are provided. With at least one receiving antenna and a transmitting antenna with different antenna gains, the antenna gains of the receiving antennas being greater than the antenna gain of the transmitting antenna and different from each other, the invention detects the communication signals of the receiving antennas for recording communication quality thereof. The mechanism switches in real time to an appropriate receiving antenna according to the received communication quality. This mechanism optimizes the signal transmission distance and communication stability.

14 Claims, 5 Drawing Sheets

ASYMMETRIC GAIN COMMUNICATION DEVICE AND COMMUNICATION METHOD THEREOF

BACKGROUND OF THE INVENTION

1. Field of Invention

The invention relates to a communication device and a communication method. In particular, the invention relates to an asymmetric gain communication device whose receiving antennas have larger gains than the transmission antenna and whose receiving antennas are selected to use according to the communication quality. The invention also pertains to the communication thereof.

2. Related Art

In recent years, the popularity and rapid developments of wireless communications have boosted the invention of various kinds of wireless communication devices. Different countries have different regulations on the emission power of specific frequencies in order to effectively use and control the wireless spectrum. Therefore, different wireless communication protocols are used worldwide. However, this limits the signal transmission distance.

Generally speaking, a wireless communication device has one antenna for transceiving signals. Its emission power is regulated by local laws. This means that if one wants to increase the signal transmission distance by increasing the antenna gain, the emission power of the gain has to be raised beyond the requirements of local laws. Under the constraints of regulations, vendors have been trying hard to increase the signal transmission distances of wireless communication devices.

In view of this, some vendors propose to increase the antenna gain and detect whether the emission power exceeds the regulations. If the emission power is too high, then it automatically reduces the power before further signal emissions. Otherwise, the power remains the same. However, increasing the antenna gain will result in a narrow radiation angle for the antenna. It is then easily affected by the environment to have deviations and communication instability.

In summary, the prior art long has the problem of being unable to extend signal transmission distances under the constraints of emission power regulations. It is therefore imperative to provide a better solution.

SUMMARY OF THE INVENTION

In view of the foregoing, the invention provides an asymmetric gain communication device and the communication method of the same.

The disclosed asymmetric gain communication device includes: an transmission antenna, receiving antennas, a transceiving unit, a recording unit, a computing unit, and a controlling unit. The transmission antenna emits signals. The receiving antennas receive the communication signals emitted by another communication device. The antenna gains of the receiving antennas are larger than the antenna gain of the transmission antenna. The transceiving unit couples to the transmission antenna and to the receiving antennas via a selector. The transceiving unit generates emission signals and sends out the signals via the transmission antenna. During initialization, the transceiving unit receives communication signals from each of the receiving antennas. The recording unit couples to the transceiving unit for detecting the communication signals received by each of the receiving antennas, recording the corresponding communication quality. The computing unit couples to the recording unit to compare the received communication quality. It then selects one of the receiving antennas according to the communication quality and the antenna gains of the receiving antennas. The controlling unit switches the selector according to the selected receiving antenna. The selector remains electrical connection with the selected receiving antenna. The transceiving unit continues to receive the communication signals from the selected receiving antenna.

The disclosed asymmetric gain communication method, applied to the communications with another communication device, includes the steps of: providing an transmission antenna for emitting signals; providing receiving antennas for receiving communication signals emitted by the other communication device, the antenna gains of the receiving antennas being greater than that of the transmission antenna; receiving communication signals from each of the receiving antennas during initialization; detecting the communication signals received by each of the receiving antennas for recording the corresponding communication quality; comparing the recorded communication quality and selecting one of the receiving antennas according to the communication quality and the antenna gain of the corresponding receiving antenna; and switching a selector according to the selected receiving antenna so that the selector remains electrical connection with the selected receiving antenna, thereby using the selected receiving antenna to receive communication signals continuously.

As described above, the disclosed device and method differ from the prior art in that the invention has several transmission antennas with different antenna gains and at least one receiving antenna. The antenna gains of the receiving antenna are greater than the transmission antennas and different from each other. During operations, the communication signals of the receiving antennas are detected to record the communication quality, which is used to switch and select an appropriate receiving antenna.

The disclosed techniques can optimize the signal transmission distance and communication stability.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Before describing the disclosed asymmetric gain communication device and the communication method thereof, we first describe the environment that the invention applies to. The asymmetric gain communication device referred herein is used in a communication device (e.g., hub, router) for transmitting various kinds of signals via transmission antennas and receiving antennas. The antenna gains of the receiving antennas are greater than those of the transmission antennas in order to increase the receiving distance of signals. Since the communication device has different gains for the receiving antennas and transmission antennas, the receiving distance and transmitting distance of signals are also different. It thus needs another communication device with the same antenna configuration to extend the signal transmission distance while ensuring normal signal transmission at the same time. In other words, the antenna gains of the receiving antennas and transmission antennas of the first communication device have to be the same as those of the second communication device. As a result, normal communications can be maintained even if the receiving distance and the emitting distance are different. It should be noted that even though the invention can extend the signal transmission distance only when the other party has the same antenna configuration, it can still communicate with other communication devices with different antenna configurations when the signal transmission distance is not extended.

Figure 1A:
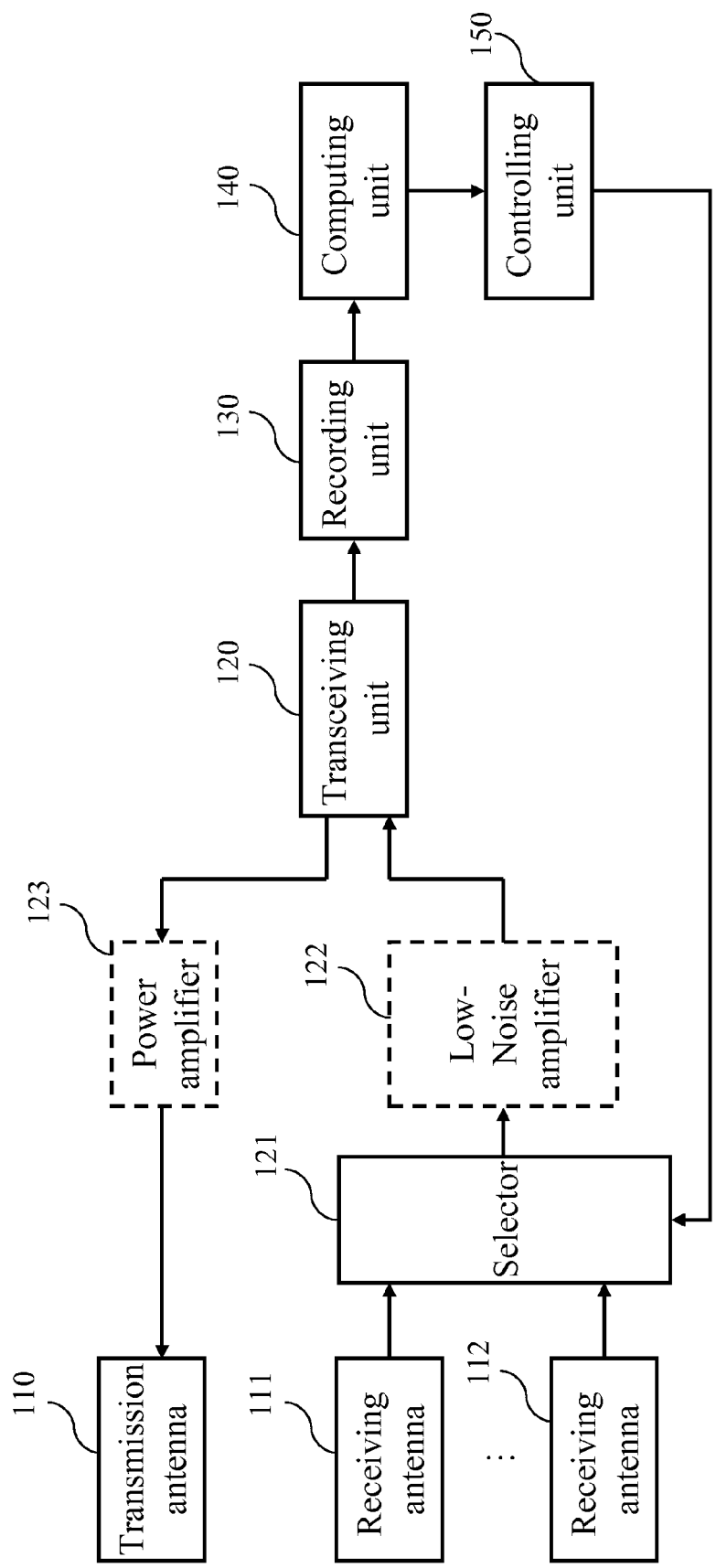
FIG. 1A is a block diagram of a first embodiment of the disclosed asymmetric gain communication device.

Please refer to FIG. 1A for the block diagram of a first embodiment of the disclosed asymmetric gain communication device. The asymmetric gain communication device according to the invention includes an transmission antenna 110, receiving antennas 111, 112, a transceiving unit 120, a selector 121, a recording unit 130, an computing unit 140, and a controlling unit 150. The transmission antenna 110 emits signals. The receiving antennas 111, 112 receive communication signal sent from another communication device. Moreover, the antenna gains of the receiving antennas 111, 112 are greater than that of the transmission antenna 110. In practice, there can be several receiving antennas 111, 112 and one transmission antenna 110, where the antennas gains of the receiving antennas 111, 112 are different and greater than that of the transmission antenna 110. For example, suppose the antenna gain of the transmission antenna 110 is 3 dBi. The antenna gains of the receiving antennas 111, 112 can be 5 dBi, 7 dBi, 10 dBi, and so on. It should be emphasized that the invention does not impose any restriction on the antenna gains of the transmission antenna 110 and receiving antennas 111, 112. The antenna gain of the transmission antenna 110 should comply with the local telecommunication regulations on emission power. The antenna gains of the receiving antennas 111, 112 are greater than that of the transmission antenna 110. Besides, in practice, there can be only one receiving antenna 111 and one transmission antenna 110 for receiving communication signals and emitting signals. Still, the antenna gain of the receiving antenna 111 has to be greater than that of the transmission antenna 110.

The transceiving unit 120 couples to the transmission antenna 110 and to the receiving antennas 111, 112 via a selector 121. The transceiving unit 120 generates emission signals and sends them via the transmission antenna 110. During initialization, communication signals are received from each of the receiving antennas 111, 112. This process continues after the initialization completes. In practice, the transceiving unit 120 can perform digital/analog conversions. For example, it can convert the communication signals received by the receiving antennas 111, 112 into digital data, and also convert digital data into analog emission signals to be emitted by the transmission antenna 110. It should be noted that the selector 121 is a switch that is controlled by electrical signals to electrically connect (i.e., short circuit) to one of the receiving antennas. After the initialization, the transceiving unit continues to use this receiving antenna to receive communication signals. The electrical connections between the transceiving unit 120 and the transmission and receiving antennas will be detailed with reference to figures later. Moreover, the transceiving unit 120 can further couples to the transmission antenna 110 via a power amplifier 123 for emitting signals.

The recording unit 130 couples to the transceiving unit 120 for detecting the communication signals received by each of the receiving antennas 111, 112 and recording the corresponding communication quality. In practice, the invention takes turns to detect the power strength of the communication signals received by the receiving antennas 111, 112 and to analyze the bit error rate (BER), or either of them, and to detect the source of the communication signals, recording them as the corresponding communication quality. The recording unit 130 can be volatile or non-volatile memory such as cache memory, flash memory, and so on. Since the power strength detection and BER analysis belong to the prior art, they are not further described herein.

The computing unit 140 couples to the recording unit 130 for comparing the communication quality recorded by the recording unit 130. It then selects one of the receiving antennas according to the communication quality and the antenna gains thereof. The selection priority can be the communication quality first and the antenna gain second. For example, the invention first selects the receiving antennas with good communication quality, and then finds the receiving antenna with the smallest antenna gain from them. Suppose the computing unit 140 finds that the communication quality of the first receiving antenna 111 is better than that of the second receiving antenna 112, and that the antenna gain of the first receiving antenna 111 is smaller than that of the second receiving antenna 112. Then the computing unit 140 selects the first receiving antenna 111 as the antenna for receiving communication signals. In practice, the computing unit 140 pre-stores the antenna gains of the receiving antennas 111, 112. When the communication quality is the same, the computing unit 140 automatically selects the receiving antenna with the lowest antenna gain to increase the radiation range (i.e., increasing shifts for maintaining communications). Besides, the computing unit 140 further filters the communication quality recorded by the recording unit 130 in advance. For example, under the conditions of similar time and same receiving antenna, it first removes a few records with larger disparities in communication quality before further comparison.

The controlling unit 150 switches the selector 121 of the transceiving unit 120 according to the receiving antenna selected by the computing unit 140. The selector 121 maintains its electrical connection with the selected receiving antenna. The transceiving unit 120 continues to receive communication signals from the selected receiving antenna. In other words, after the selector 121 and the selected receiving antenna are in electrical connections, the transceiving unit 120 completes the initialization. It then exclusively uses the selected receiving antenna to receive the communication signals continuously. It should be mentioned that when the transceiving unit 120 cannot receive the communication signals or the communication quality is bad, the transceiving unit 120 resets in the initialization state and receives communication signals from the antennas again 111, 112, for the computing unit 140 to reselect one of the receiving antennas to receive the communication signals.

Besides, the disclosed asymmetric gain communication device can further include a low-noise amplifier 122, whose one end serially connects to the selector 121 and whose other end serially connects to the transceiving unit 120 in order to amplifying the communication signals from the selected receiving antenna.

Figure 1B:
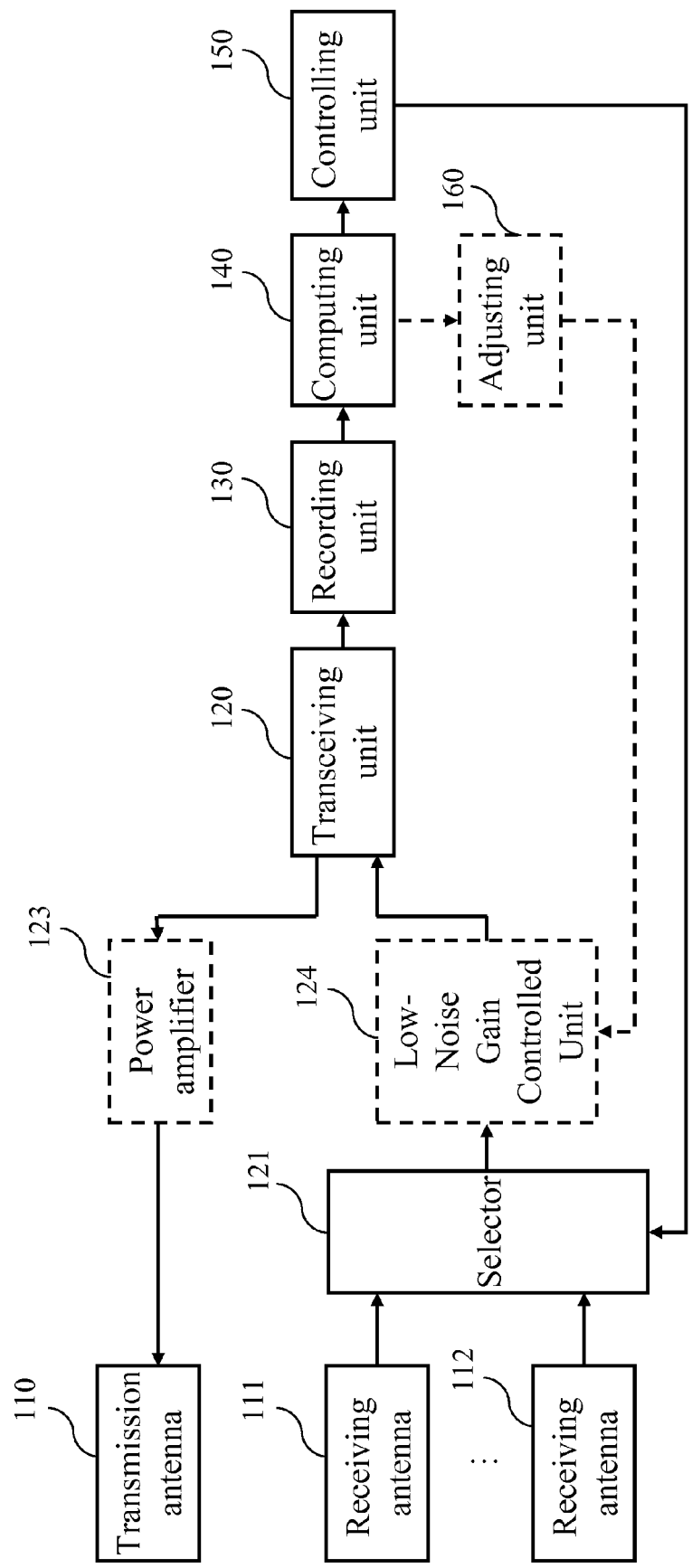
FIG. 1B is a block diagram of a second embodiment of the disclosed asymmetric gain communication device.

Please refer to FIG. 1B for the block diagram of a second embodiment of the disclosed asymmetric gain communication device. In practice, the invention can also replace the low-noise amplifier 122 by a low-noise gain controlled unit 124, and include an adjusting unit 160 coupling to the computing unit 140 and the low-noise gain controlled unit 124. The adjusting unit 160 adjusts (amplifies or attenuates) the gain of the low-noise gain controlled unit 124 according to the communication quality of the receiving antenna selected by the computing unit 140. The communication quality is maintained at the optimal state. The low-noise gain controlled unit 124 can be of automatic gain control type, to be detailed later.

Figure 2:
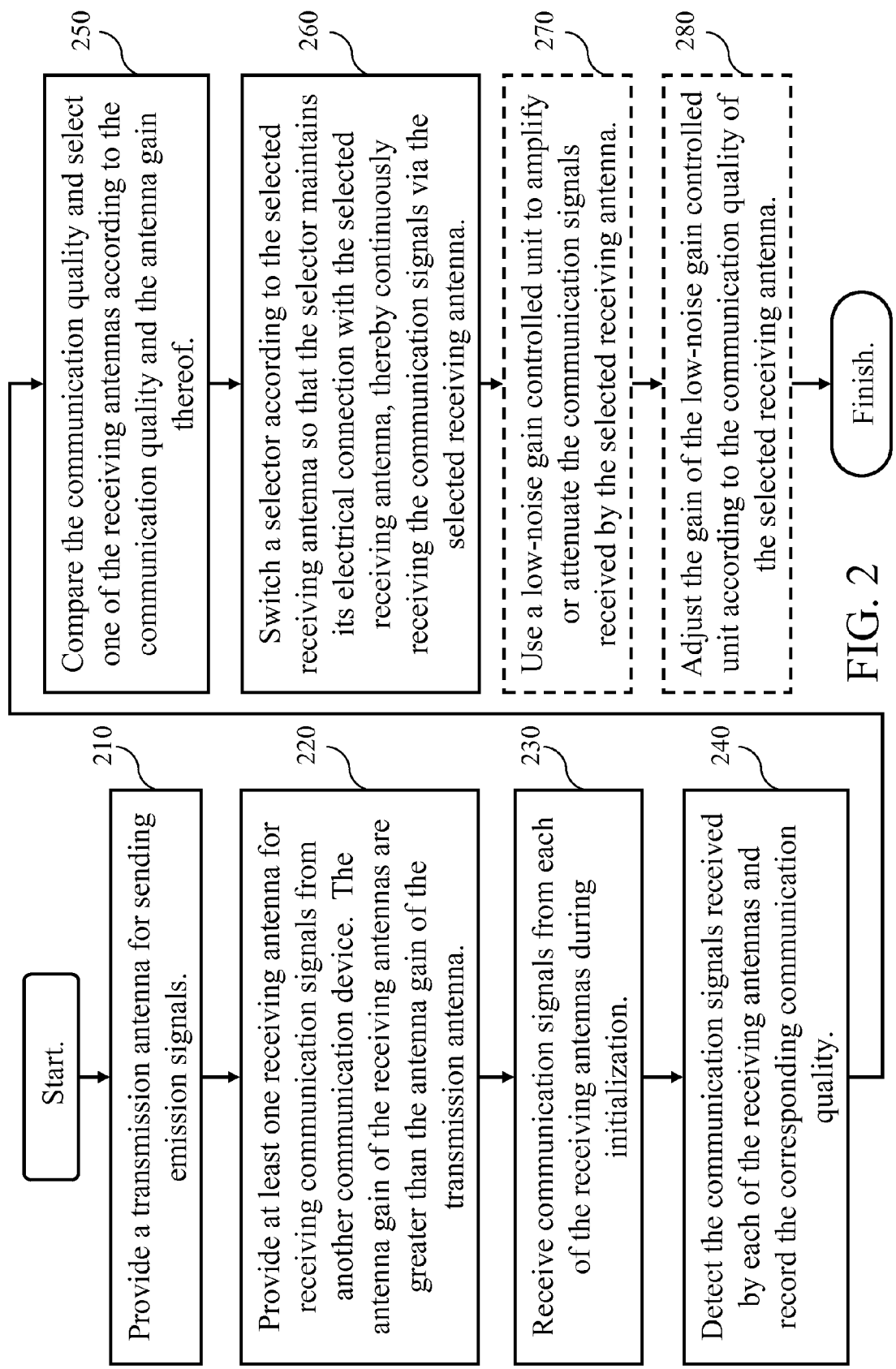
FIG. 2 is a flowchart of the disclosed asymmetric gain communication method.

Please refer to FIG. 2 for a flowchart of the disclosed asymmetric gain communication method, used for communications with another communication device. The method includes the steps of: providing an transmission antenna for emitting signals (step 210); providing receiving antennas for receiving communication signals emitted by the other communication device, the antenna gains of the receiving antennas being greater than that of the transmission antenna (step 220); receiving communication signals from each of the receiving antennas during initialization (step 230); detecting the communication signals received by each of the receiving antennas for recording the corresponding communication quality (step 240); comparing the recorded communication quality and selecting one of the receiving antennas according to the communication quality and the antenna gain of the corresponding receiving antenna (step 250); switching a selector according to the selected receiving antenna so that the selector remains electrical connection with the selected receiving antenna, thereby using the selected receiving antenna to receive communication signals continuously (step 260). Through the above-mentioned steps, with at least one receiving antenna and a transmitting antenna with different antenna gains, the antenna gains of the receiving antennas being greater than the antenna gain of the transmission antenna and different from each other, the invention detects the communication signals of the receiving antennas for recording communication quality thereof. The invention switches in real time to an appropriate receiving antenna according to the received communication quality. This mechanism optimizes the signal transmission distance and communication stability. It should be noted that after step 260, the communication signals received by the selected receiving antenna are amplified or attenuated by the low-noise gain controlled unit (step 270), followed by adjusting the gain of the low-noise gain controlled unit according to the communication quality of the selected receiving antenna (step 280).

Figure 3:
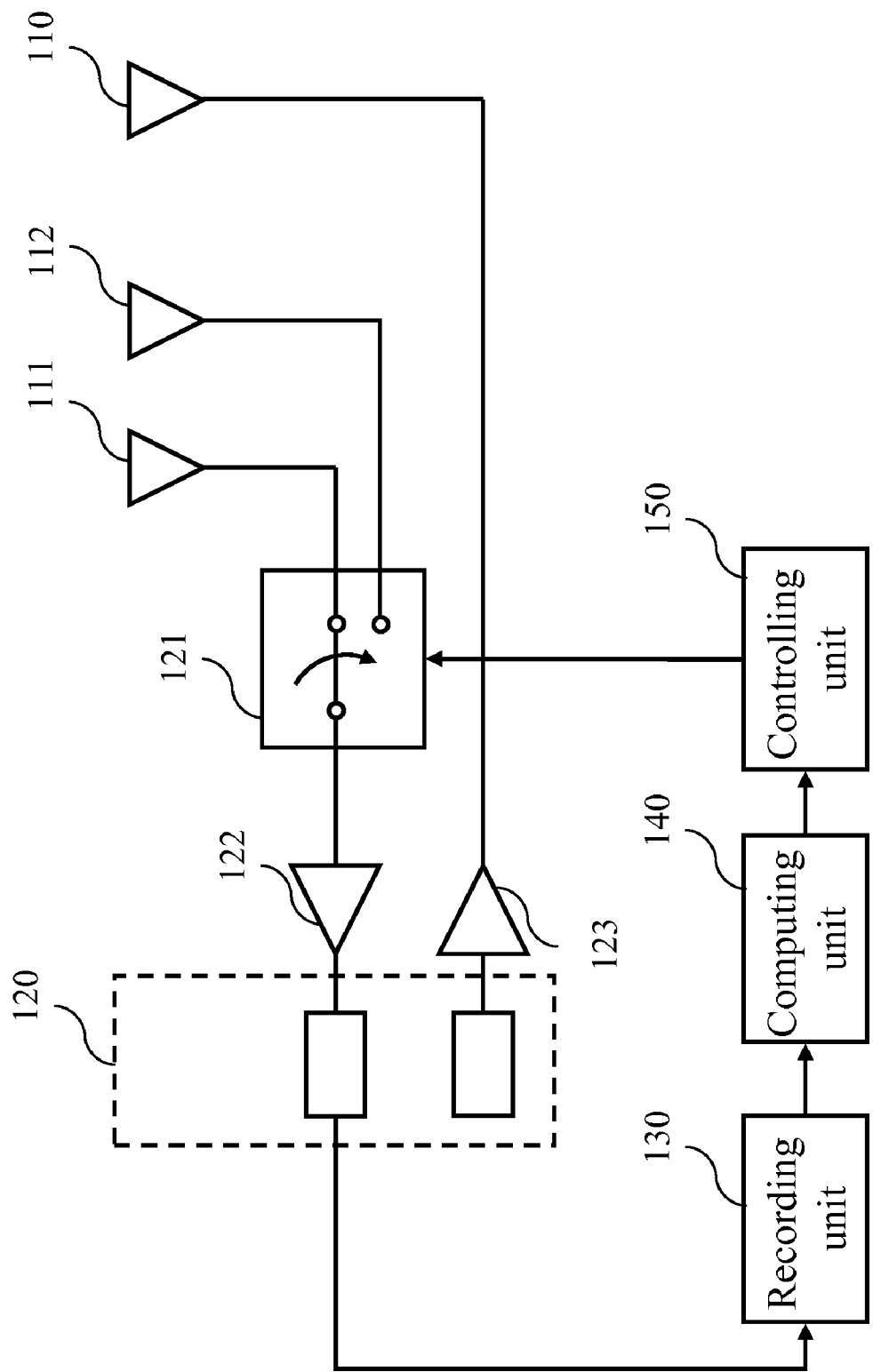
FIG. 3 is a circuit diagram of the selector in the disclosed controlling unit.
Figure 4:
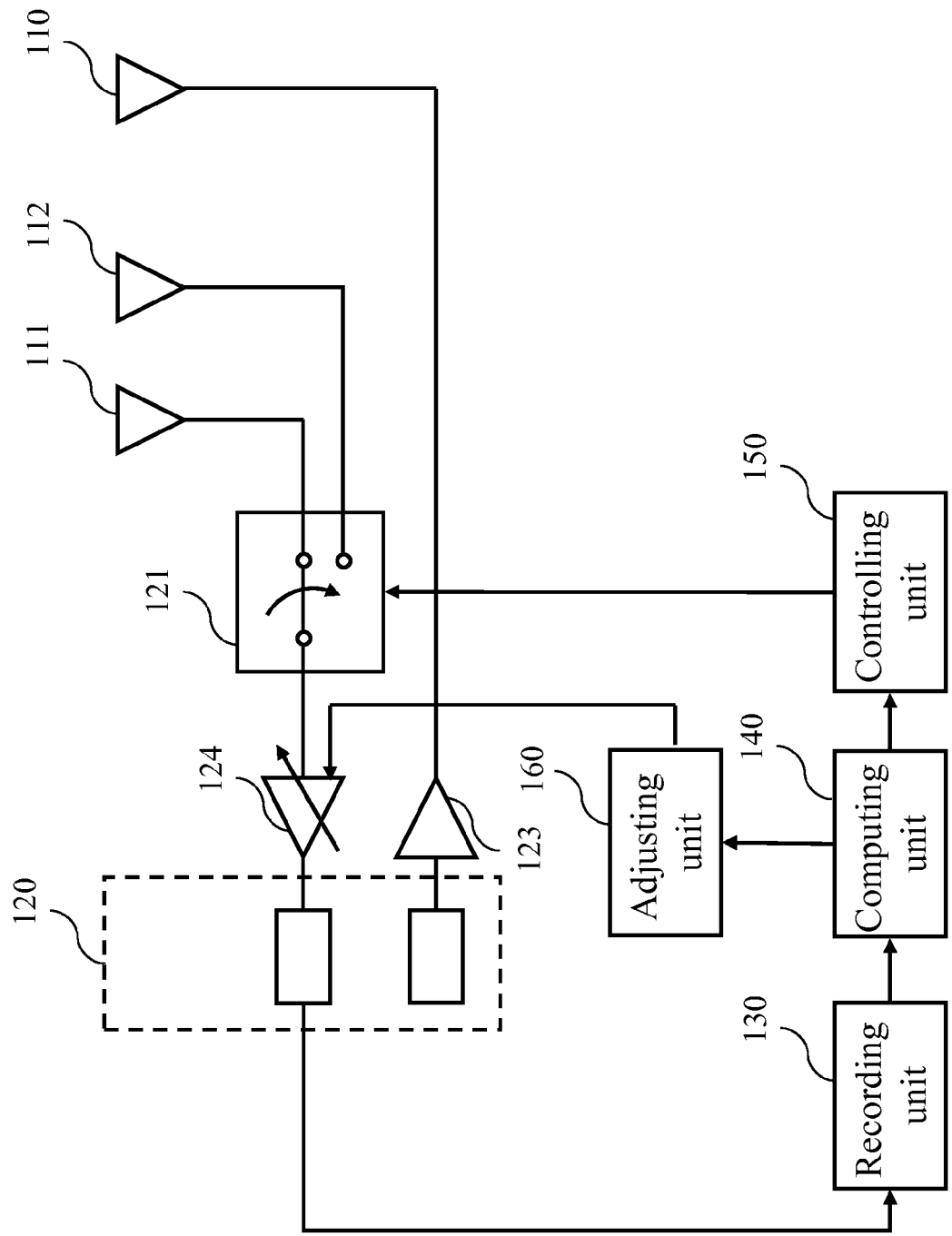
FIG. 4 is a circuit diagram of using the adjusting unit to adjust the gain of the low-noise gain controlled unit according to the invention.

Please refer to FIGS. 3 and 4 for an embodiment of the invention. FIG. 3 is a schematic view of the circuit of the selector in the disclosed controlling unit. The transmission antenna 110 emits signals. The receiving antennas 111, 112 receive the communication signals emitted from another communication device. The antenna gains of the receiving antennas 111, 112 are greater than the antenna gain of the transmission antenna 110. The transceiving unit 120 can couple to the low-noise amplifier 122. A selector 121 is serially connected between the low-noise amplifier 122 and the receiving antennas 111, 112. In this embodiment, the transceiving unit 120 couples to the two receiving antennas 111, 112 via the serially connected low-noise amplifier 122 and the one-to-two switch (i.e., the selector 121) for receiving communication signals. Moreover, the transceiving unit 120 couples to an transmission antenna 110 via a power amplifier 123 for emitting signals.

Afterwards, the recording unit 130 couples to the transceiving unit 120 for detecting the communication signals received by each of the receiving antennas 111, 112 and recording the communication quality of the corresponding receiving antennas 111, 112. For example, the recording unit 130 records the communication quality of the receiving antenna 111 as '−70 dbm; good and the communication quality of the receiving antenna 112 as '−80 dbm; bad'. Here '−70 dbm' and '−80 dbm' represent the receiving power strength of the receiving antenna 111 and the receiving antenna 112, respectively; 'good' and 'bad' are determined by the recording unit 130 according to the BER of the receiving antenna 111 and the receiving antenna 112, respectively.

After the computing unit 140 compares the communication quality recorded by the recording unit 130, one receiving antenna is selected according to the communication quality and the antenna gain thereof. In the above-mentioned example, suppose the antenna gain of the first receiving antenna 111 is smaller than that of the second receiving antenna 112. Since the communication quality of the receiving antenna 111 is better and the antenna gain thereof is smaller, the computing unit 140 chooses the receiving antenna 111 between the two receiving antennas 111, 112. In this case, the controlling unit 150 controls the selector 121 to switch according to the receiving antenna 111 selected by the computing unit 140. The selector 121 and the receiving antenna 111 are thus in electrical connections (i.e., short circuit), whereas the selector 121 and the receiving antenna 112 are disconnected. As a result, the transceiving unit 120 can receive the communication signals via the receiving antenna 111. The low-noise amplifier 122 then amplifies the communication signals for subsequent signal processing. It should be noted that, in practice, suppose the computing unit 140 finds that the two receiving antennas 111, 112 have the same communication quality after comparison. The computing unit 140 further compares the antenna gains of the two receiving antennas 111, 112 in order to select the one with a smaller antenna gain to use. If there are three or more receiving antennas, the computing unit 140 can read the antenna gains of the receiving antennas with the best and the worst communication quality to compute an average. It then selects a receiving antenna with an antenna gain closest to the average.

Please refer to FIG. 4 for a circuit diagram of the disclosed adjusting unit for adjusting the gain of the low-noise gain controlled unit. The adjusting unit 160 can adjust the gain of the low-noise gain controlled unit 124 according to the communication quality of the receiving antenna selected by the computing unit 140, maintaining the communication quality at the best. In this embodiment, the low-noise gain controlled unit 124 can be of automatic gain control type, and in electrical connection with the adjusting unit 160 for receiving the electrical signal from the adjusting unit 160 to adjust the gain. For example, suppose the controlling unit 150 controls the selector 121 so that the transceiving unit 120 and the receiving antenna 111 are electrically connected. Suppose the communication signals received by the receiving antenna 111 have different receiving powers strength, e.g., '−70 dbm' and '−80 dbm'. Then the computing unit 140 can filter out unnecessary communication signals according to the communication quality (e.g., removing the communication signals of lower receiving power or according to the source of the communication signals). Afterwards, the adjusting unit 160 adjusts the gain of the low-noise gain controlled unit 124 according to the receiving power of the filtered communication signals. For example, when the receiving power strength is below −100 dbm, then the gain is automatically tripled. When the receiving power strength is above 0 dbm, the gain is automatically attenuated by a factor of two, and so on. Although the above example is used to explain the receiving power and gain adjustments, the invention is not limited by the particular example. As long as the gain of the low-noise gain controlled unit 124 can be adjusted (amplified or attenuated) according to the receiving power strength or signal quality (determined by the BER for example), such methods should be included in the scope of the invention as well.

In summary, the disclosed device and method differ from the prior art in that the invention has several transmission antennas 110 with different antenna gains and at least one receiving antenna. The antenna gains of the receiving antenna are greater than the transmission antennas and different from each other. During operations, the communication signals of the receiving antennas are detected to record the communication quality, which is used to switch and select an appropriate receiving antenna. The disclosed techniques can solve the problems in the prior art and optimize the signal transmission distance and communication stability.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An asymmetric gain communication device, comprising:
   a transmission antenna for sending emission signals;
   at least one receiving antennas for receiving communication signals emitted from another communication device, the antenna gains of the receiving antennas being greater than the antenna gain of the transmission antenna;
   a transceiving unit coupled to the transmission antenna and coupled to the receiving antennas via a selector, for generating the emission signals for the transmission antenna to send and for receiving the communication signals of each of the receiving antennas during initialization;
   a recording unit coupled to the transceiving unit for detecting the communication signals received by each of the receiving antennas and recording the corresponding communication quality;
   a computing unit coupled to the recording unit for comparing the communication quality and selecting one of the receiving antennas according to the communication quality and the antenna gain thereof; and
   a controlling unit for switching the selector according to the selected receiving antenna so that the selector maintains electrical connection with the selected receiving antenna for the transceiving unit to continuously receiving the communication signals from the selected receiving antenna.

2. The asymmetric gain communication device of claim 1, wherein the selector is a switch for the transceiving unit to electrically connect to one of the receiving antennas.

3. The asymmetric gain communication device of claim 1 further comprising a low-noise gain controlled unit whose one end serially connects to the selector and whose other end serially connects to the transceiving unit for amplifying or attenuating the communication signals received by the selected receiving antenna.

4. The asymmetric gain communication device of claim 3 further comprising an adjusting unit coupled to the computing unit and the low-noise gain controlled unit for adjusting the gain of the low-noise gain controlled unit according to the communication quality of the selected receiving antenna.

5. The asymmetric gain communication device of claim 1, wherein the communication quality includes the power strength of the communication signals and a bit error rate (BER) or either of the power strength of the communication signals and BER, and the signal source.

6. The asymmetric gain communication device of claim 1, wherein the computing unit selects preferably a receiving antenna with the smallest antenna gain when the communication quality is the same.

7. The asymmetric gain communication device of claim 1, wherein the computing unit reads the antennas gains of the receiving antennas with the best communication quality and the worst communication quality to compute an average and selects a receiving antenna with the antenna gain closest to the average.

8. An asymmetric gain communication method used for communications with another communication device, comprising the steps of:
   providing a transmission antenna for sending emission signals;
   providing a plurality of receiving antennas for receiving communication signals emitted by another communication device, the antenna gains of the receiving antennas being larger than the antenna gain of the transmission antenna;
   receiving communication signals at each of the receiving antennas during initialization;
   detecting the communication signals received by each of the receiving antennas and recording corresponding communication quality;
   comparing the communication quality and selecting one of the receiving antennas according to the communication quality and the antenna gain thereof; and
   switching a selector according to the selected receiving antenna so that the selector maintains electrical connection with the selected receiving antenna for the transceiving unit to continuously receiving the communication signals from the selected receiving antenna.

9. The asymmetric gain communication method of claim 8, wherein the selector is a switch for switching an electrical connection with one of the receiving antennas.

10. The asymmetric gain communication method of claim 8 further comprising the step of using a low-noise gain controlled unit to amplify or attenuate the communication signals received by the selected receiving antenna.

11. The asymmetric gain communication method of claim 10 further comprising the step of adjusting the gain of the low-noise gain controlled unit according to the communication quality of the selected receiving antenna.

12. The asymmetric gain communication method of claim 8, wherein the communication quality includes the power strength of the communication signals and a BER or either of the power strength of the communication signals and BER, and the signal source.

13. The asymmetric gain communication method of claim 8, wherein a receiving antenna with the smallest antenna gain is selected in the step of selecting one of the receiving antennas when the communication quality is the same.

14. The asymmetric gain communication method of claim 8, wherein the step of selecting one of the receiving antennas reads the antennas gains of the receiving antennas with the best communication quality and the worst communication quality to compute an average and selects a receiving antenna with the antenna gain closest to the average.

* * * * *